United States Patent
Zhou

(10) Patent No.: US 10,572,340 B2
(45) Date of Patent: Feb. 25, 2020

(54) SOLID STATE DISK STORAGE DEVICE AND METHOD FOR ACCESSING DATA IN SOLID STATE DISK STORAGE DEVICE

(71) Applicant: Huawei Technologies Co., Ltd., Shenzhen (CN)

(72) Inventor: Guanfeng Zhou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 15/585,858

(22) Filed: May 3, 2017

(65) Prior Publication Data

US 2017/0235636 A1    Aug. 17, 2017

Related U.S. Application Data

(63) Continuation of application No. PCT/CN2015/093591, filed on Nov. 2, 2015.

(30) Foreign Application Priority Data

Dec. 29, 2014  (CN) .......................... 2014 1 0837073

(51) Int. Cl.
   *G11C 29/00*    (2006.01)
   *G06F 11/00*    (2006.01)
   (Continued)

(52) U.S. Cl.
   CPC ........ *G06F 11/1068* (2013.01); *G06F 3/0619* (2013.01); *G06F 3/0655* (2013.01);
   (Continued)

(58) Field of Classification Search
   CPC .............. G06F 11/1068; G06F 11/1102; G06F 11/1048; G06F 12/2046; G06F 3/06;
   (Continued)

(56) References Cited

U.S. PATENT DOCUMENTS 5,802,553 A * 9/1998 Robinson .............. G06F 3/0608
                                                             711/103
9,047,189 B1 * 6/2015 Gupta ..................... G06F 11/10
                   (Continued)

FOREIGN PATENT DOCUMENTS

CN    101473308 A    7/2009
CN    101876947 A    11/2010
                   (Continued)

OTHER PUBLICATIONS

Foreign Communication From a Counterpart Application, Chinese Application No. 201410837073.6, Chinese Search Report dated Apr. 9, 2018, 2 pages.
(Continued)

*Primary Examiner* — Christine T. Tu
(74) *Attorney, Agent, or Firm* — Conley Rose, P.C.

(57) ABSTRACT

A method for managing a solid state disk (SSD) storage device and accessing data of the SSD storage device in order to resolve problems of highly complex data management in an SDD and different service lives of NAND flash physical pages in a NAND flash physical block where, lengths of a user data area, primary metadata, and an error checking and correction (ECC) code in each storage unit of an SSD storage device are set to fixed values. As a result, a format of data stored in the storage unit is fixed, and the ECC code can also ensure consistency between data in the user data area and the primary metadata at a fixed code rate in order to ensure correctness and integrity of the data in the user data area and the primary metadata.

17 Claims, 2 Drawing Sheets

(51) Int. Cl.
  *G06F 11/10* (2006.01)
  *G06F 3/06* (2006.01)
  *G06F 21/64* (2013.01)
  *G11C 29/52* (2006.01)
  *G06F 21/60* (2013.01)

(52) U.S. Cl.
  CPC ............ *G06F 3/0688* (2013.01); *G06F 21/64* (2013.01); *G11C 29/52* (2013.01); *G06F 21/602* (2013.01)

(58) Field of Classification Search
  CPC ...... G06F 3/0608; G06F 3/0619; G06F 3/064; G06F 3/0644; G06F 3/0655; G06F 3/0679; G06F 3/0688; G06F 21/64; G06F 21/602; G11C 29/52; H03M 13/19; H03M 13/05
  See application file for complete search history.

(56) References Cited

U.S. PATENT DOCUMENTS

| | | |
|---|---|---|
| 2001/0028523 A1 | 10/2001 | Moro et al. |
| 2007/0268905 A1 | 11/2007 | Baker et al. |
| 2010/0325351 A1 | 12/2010 | Bennett |
| 2011/0003514 A1 | 1/2011 | Nguyen et al. |
| 2011/0138100 A1 | 6/2011 | Sinclair |
| 2011/0320915 A1 | 12/2011 | Khan |
| 2012/0290898 A1 | 11/2012 | Franceschini et al. |
| 2013/0268719 A1* | 10/2013 | Dover ................. G06F 11/1076 711/103 |
| 2014/0095956 A1 | 4/2014 | Ozdemir et al. |
| 2017/0220256 A1* | 8/2017 | Balasubramonian ....................... G06F 12/0238 |

FOREIGN PATENT DOCUMENTS

| | | |
|---|---|---|
| CN | 102576330 A | 7/2012 |
| CN | 102754088 A | 10/2012 |
| CN | 102934093 A | 2/2013 |
| CN | 103488578 A | 1/2014 |
| WO | 2012006106 A2 | 1/2012 |
| WO | 2012154980 A1 | 11/2012 |

OTHER PUBLICATIONS

Foreign Communication From a Counterpart Application, Chinese Application No. 201410837073.6, Chinese Office Action dated Apr. 20, 2018, 8 pages.
Foreign Communication From a Counterpart Application, European Application No. 15874957.2, Extended European Search Report dated Oct. 24, 2017, 7 pages.
Foreign Communication From a Counterpart Application, PCT Application No. PCT/CN2015/093591, English Translation of International Search Report dated Feb. 2, 2016, 2 pages.
Foreign Communication From a Counterpart Application, PCT Application No. PCT/CN2015/093591, English Translation of Written Opinion dated Feb. 2, 2016, 7 pages.

* cited by examiner

US 10,572,340 B2

SOLID STATE DISK STORAGE DEVICE AND METHOD FOR ACCESSING DATA IN SOLID STATE DISK STORAGE DEVICE

CROSS-REFERENCE TO RELATED APPLICATIONS

This application is a continuation of International Patent Application No. PCT/CN2015/093591 filed on Nov. 2, 2015, which claims priority to Chinese Patent Application No. 201410837073.6, filed on Dec. 29, 2014. The disclosures of the aforementioned applications are hereby incorporated by reference in their entireties.

TECHNICAL FIELD

The present disclosure relates to the field of information technologies, and in particular, to a solid state disk (SSD) storage device and a method for accessing data in an SSD storage device.

BACKGROUND

With large-scale development of information technologies, an SSD comes into being. An SSD using a Flash medium features high performance and low power consumption, and can greatly reduce a delay of a storage system. The SSD has higher reliability because the SSD does not need a mechanical structure.

As a storage medium of an SSD, a NAND flash has limited erasing times. This is a key factor affecting a service life and performance of the SSD. In the NAND flash, data is organized in a form of a NAND flash physical block and a NAND flash physical page. One NAND flash physical block includes several NAND flash physical pages. A NAND flash physical block is a smallest unit for performing an erase operation, and a NAND flash physical page is a smallest unit for performing a write/read operation. After data is written to a NAND flash physical page, data can be written to the NAND flash physical page again only after an erase operation is performed on a NAND flash physical block in which the NAND flash physical page is located. A NAND flash physical page includes several storage units, and data is stored in a storage unit of the NAND flash in a form of a charge in a floating gate. Erasing performed on a storage unit reduces insulativity of an insulation layer between the floating gate and a channel. After a quantity of erasing times, an electron cannot be maintained in the floating gate for an enough time. Consequently, a large quantity of bit errors are produced in stored data. If an error correction capability of an SSD controller is exceeded, it is considered that a corresponding NAND flash physical page/physical block is already damaged.

Reducing an amount of data actually written to a NAND flash medium is a key factor for improving a service life of an SSD. In an actual application, data written to an SSD is spatially correlated. A method in which data is compressed before being written to a NAND flash is proposed to reduce an amount of actually written data. However, in other approaches, error checking and correction (ECC) logic of an SSD controller needs to support multiple code rates. Consequently, it is highly complex to implement the ECC logic, a software management algorithm is complex, and service lives of different physical pages in a physical block of the NAND flash are different.

SUMMARY

Embodiments of the present disclosure provide a method for managing an SSD storage device and accessing data of the SSD storage device, to reduce complexity of data management in an SDD and allow NAND flash physical pages in a NAND flash physical block to have a same service life.

According to a first aspect, an embodiment of the present disclosure provides an SSD storage device, where the SSD storage device includes at least one storage unit, and the storage unit is a smallest unit for performing a write or read operation in the SSD storage device, where the storage unit includes a user data area, primary metadata, and an ECC code, and lengths of the user data area, the primary metadata, and the ECC code are fixed values. The user data area includes at least two partitions having a same length, and each partition is configured to store compressed data. The primary metadata in the storage unit records a compression identifier of the data stored in the user data area and a quantity of partitions occupied by each piece of compressed data in the user data area, and the ECC code ensures consistency of data in the storage unit.

With reference to the first aspect, in a first possible implementation manner of the first aspect, a user data area in each storage unit has a same quantity of partitions.

With reference to the first aspect or the first possible implementation manner of the first aspect, in a second possible implementation manner of the first aspect, the SSD storage device further includes a secondary-metadata generation unit, where the secondary-metadata generation unit is configured to generate secondary metadata of to-be-stored data, where the secondary metadata includes a length of the compressed to-be-stored data and a logical block address (LBA) of the compressed to-be-stored data.

With reference to the second possible implementation manner of the first aspect, in a third possible implementation manner of the first aspect, the SSD storage device further includes a padding unit configured to add padding data when a sum of a length of the secondary metadata and the length of the compressed to-be-stored data is not an integer multiple of the length of the partition, such that a sum of the length of the secondary metadata, the length of the compressed to-be-stored data, and a length of the padding data is a smallest integer multiple of the length of the partition.

With reference to the second possible implementation manner of the first aspect or the third possible implementation manner of the first aspect, in a fourth possible implementation manner of the first aspect, the secondary-metadata generation unit adds the generated secondary metadata in front of the compressed to-be-stored data.

With reference to the second possible implementation manner of the first aspect, in a fifth possible implementation manner of the first aspect, the SSD storage device further includes a buffer processing unit configured to write the secondary metadata and the compressed to-be-stored data to a buffer of the SSD storage device.

With reference to the third possible implementation manner of the first aspect, in a sixth possible implementation manner of the first aspect, the secondary metadata, the compressed to-be-stored data, and the padding data are written to a buffer of the SSD storage device after the padding unit adds the padding data.

With reference to the fifth possible implementation manner of the first aspect or the sixth possible implementation manner of the first aspect, in a seventh possible implementation manner of the first aspect, the SSD storage device further includes a data write unit, where the data write unit is configured to write one or more pieces of buffered data whose lengths are equal to that of the user data area and that are in the buffer to one storage unit of the SSD storage device, where the buffered data includes the secondary metadata and the compressed to-be-stored data, or the buffered data includes the secondary metadata, the compressed to-be-stored data, and the padding data.

With reference to the first aspect, the first possible implementation manner of the first aspect, the third possible implementation manner of the first aspect, the fifth possible implementation manner of the first aspect, or the sixth possible implementation manner of the first aspect, in an eighth possible implementation manner of the first aspect, the primary metadata further includes information about mapping of a logical address of the to-be-stored data to a physical address and information about a time at which the to-be-stored data is written to the storage unit.

With reference to the seventh possible implementation manner of the first aspect, in a ninth possible implementation manner of the first aspect, the SSD storage device further includes a data recovery unit, where the data recovery unit is configured to read, according to an LBA of to-be-read data included in a data read request, a user data area, primary metadata, and an ECC code in a storage unit corresponding to the LBA, obtain a quantity of pieces of compressed data in the user data area according to the primary metadata, obtain corresponding compressed data and secondary metadata, compare whether an LBA in the secondary metadata is consistent with the LBA in the data read request, and send the corresponding obtained compressed data to a decompression engine for decompression when the LBA in the secondary metadata is consistent with the LBA in the data read request.

According to a second aspect, an embodiment of the present disclosure further provides a method for accessing data in an SSD storage device, where the SSD storage device includes at least one storage unit, the storage unit is a smallest unit for performing a write or read operation in the SSD storage device, and the method includes receiving to-be-stored data and compressing the to-be-stored data, writing the to-be-stored data to a user data area of the at least one storage unit when the compressed data is less than a preset threshold, where the user data area includes at least two partitions having a same length, and each partition is configured to store compressed data, generating primary metadata of the to-be-stored data, where the primary metadata records a compression identifier of the to-be-stored data in the user data area and a quantity of partitions occupied by the compressed to-be-stored data, and generating an ECC code corresponding to the to-be-stored data and the primary metadata, and writing the ECC code to a storage unit in which the compressed to-be-stored data exists, where the ECC code ensures consistency of data in the storage unit, where lengths of the user data area, the primary metadata, and the ECC code are fixed values.

With reference to an implementation manner of the second aspect, in a first possible implementation manner of the second aspect, a user data area in each storage unit has a same quantity of partitions.

With reference to the second aspect or the first possible implementation manner of the second aspect, in a second possible implementation manner of the second aspect, when the compressed data is less than a preset threshold, the method further includes generating secondary metadata of the to-be-stored data, where the secondary metadata includes a length of the compressed to-be-stored data and an LBA of the compressed to-be-stored data.

With reference to the second aspect or the second possible implementation manner of the second aspect, in a third possible implementation manner of the second aspect, the method further includes adding padding data when a sum of a length of the secondary metadata and the length of the compressed to-be-stored data is not an integer multiple of the length of the partition, such that a sum of the length of the secondary metadata, the length of the compressed to-be-stored data, and a length of the padding data is a smallest integer multiple of the length of the partition.

With reference to the first possible implementation manner of the second aspect, the second possible implementation manner of the second aspect, or the third possible implementation manner of the second aspect, in a fourth possible implementation manner of the second aspect, the method further includes adding the generated secondary metadata in front of the compressed to-be-stored data.

With reference to the third possible implementation manner of the second aspect or the second possible implementation manner of the second aspect, in a fifth possible implementation manner of the second aspect, the method further includes writing the secondary metadata and the compressed to-be-stored data to a buffer of the SSD storage device.

With reference to the fourth possible implementation manner of the second aspect or the third possible implementation manner of the second aspect, in a sixth possible implementation manner of the second aspect, the method further includes writing the secondary metadata, the compressed to-be-stored data, and the padding data into a buffer of the SSD storage device.

With reference to the fifth or sixth possible implementation manner of the second aspect, in a seventh possible implementation manner of the second aspect, writing the to-be-stored data into a user data area of the at least one storage unit includes writing one or more pieces of buffered data whose lengths are equal to that of the user data area and in the buffer to one storage unit of the SSD storage device, where the buffered data includes the secondary metadata, the compressed to-be-stored data, and the padding data, or the buffered data includes the secondary metadata and the compressed to-be-stored data.

With reference to the second aspect, or the first, the third, the fifth, the sixth, or the seventh possible implementation manner of the second aspect, in an eighth possible implementation manner of the second aspect, the primary metadata further includes information about mapping of a logical address of the to-be-stored data to a physical address and information about a time at which the to-be-stored data is written to the storage unit.

With reference to the seventh possible implementation manner of the second aspect, in a ninth possible implementation manner of the second aspect, the method further includes reading, according to an LBA of to-be-read data included in a data read request, a user data area, primary metadata, and an ECC code in a storage unit corresponding to the LBA, obtaining a quantity of pieces of compressed data in the user data area according to the primary metadata, obtaining corresponding compressed data and secondary metadata, comparing whether an LBA in the secondary metadata is consistent with the LBA in the data read request, and sending the corresponding obtained compressed data to a decompression engine for decompression when the LBA in the secondary metadata is consistent with the LBA in the data read request.

The embodiments of the present disclosure provide a method for managing an SSD storage device and accessing data of the SSD storage device. Lengths of a user data area, primary metadata, and an ECC code in each storage unit of an SSD storage device are set to fixed values. As a result, a format of data stored in the storage unit is fixed, and the ECC code can also ensure consistency between data in the user data area and the primary metadata at a fixed code rate in order to ensure correctness and integrity of the data in the user data area and the primary metadata. This simplifies data management, reduces complexity of ECC hardware logic. In addition, a same service life of each storage unit is also ensured because of a same ECC code rate.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
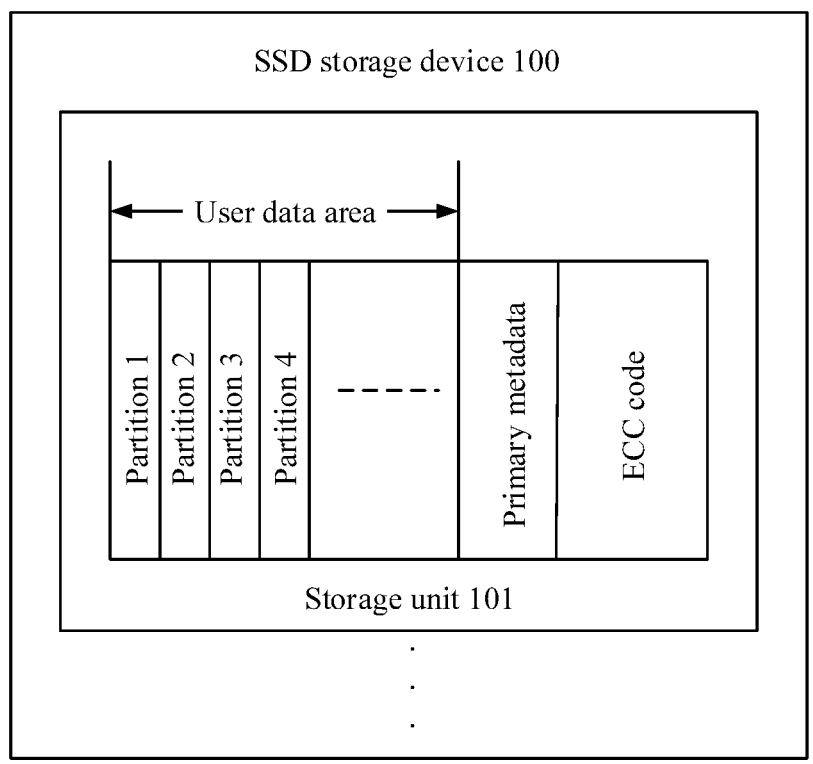
FIG. 1 is a schematic structural diagram of an SSD storage device according to an embodiment of the present disclosure.

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

A NAND flash physical page stores a fixed quantity of pieces of sector data and corresponding ECC codes. A compression engine compresses each original data block. The compression engine instructs a data selector to select compressed data for being saved into the NAND flash physical page when a size of a compressed original data block is less than a particular threshold. The NAND flash physical page stores a fixed quantity of pieces of sector data. After being compressed, the sector data occupies less space than original data does, and an additional spared area stores more ECC codes. A format of data in the NAND flash physical page is shown in Table 1.

TABLE 1

| 412 Compressed data in sectors 0-3 | 420 ECC 0 | 422 Compressed data in sectors 4-7 | 430 ECC 1 | 432 Additional spared area |
|---|---|---|---|---|

Because different types of data have different compression rates, different compressed sector data has different data lengths. As a result, a data management algorithm is needed to record additional management information in order to accurately record a start location and a data length of each piece of compressed sector data in a NAND flash physical page. In addition, because sizes of additional spared areas are different, lengths of ECC codes saved in the additional spared areas are different, and corresponding ECC code rates are also different. Therefore, ECC encoding and decoding logic needs to support different ECC code rates and dynamic switch between different code rates. This causes two problems: 1. An error correction capability of ECC logic with a lower code rate is higher than that of ECC logic with a higher ECC code rate, such that the ECC logic with a lower code rate can correct more bit errors than the ECC logic with a higher code rate. Different NAND flash physical pages have a basically same bit error rate in a same usage scenario. Therefore, a NAND flash physical page with a lower ECC code rate has a longer service life than that of a NAND flash physical page with a higher ECC code rate. This results in different service lives of the different NAND flash physical pages. 2. Different NAND flash physical pages have different ECC code rates, and ECC hardware logic needs to support dynamic switch between different ECC code rates when the different NAND flash physical pages are read. Therefore, ECC hardware logic complexity is greatly increased.

The embodiments of the present disclosure provide an SSD storage device and a method for accessing data in an SSD. Space of each NAND flash physical page in an SSD device is divided into three parts (1) user data space, (2) primary metadata, and (3) an ECC code. For ease of management, a length of each part of each NAND flash physical page is a fixed value. The user data space is further divided into multiple partitions, as shown in Table 2. In a preferred implementation manner, quantities of partitions of user data space of all NAND flash physical pages are the same. In particular, the power of 2 can be used as a quantity of partitions, such as four partitions or eight partitions.

TABLE 2

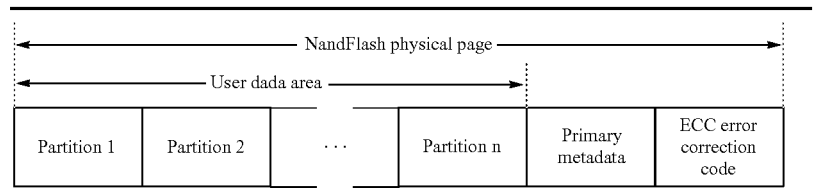

A format of the primary metadata in Table 2 may be shown in Table 3.

TABLE 3

| Compression identifier | Quantity of partitions occupied by each piece of compressed data |
|---|---|

The primary metadata includes a compression identifier and a quantity of partitions occupied by each piece of compressed data. The compression identifier identifies that data written to the user data area is compressed data.

In further implementation, the primary metadata may further include other management information, such as flash translation layer (FTL) mapping table information and a timestamp. This is not limited in the embodiments of the present disclosure. The FTL mapping table information finds a physical address according to a logical address in order to read data from a physical address of the data or write data to the physical address. The timestamp is a time at which the compressed data is written to the NAND flash physical page of the SSD, and records a time at which the compressed data written to the NAND flash physical page of the SSD is stored in the NAND flash physical page.

When data needs to be written to the SSD, a main control interface card of the SSD, for example, a serial attached small computer system interface (SAS) initiator, delivers a read and write command to the SSD and carries original data that needs to be written. The original data sent by the main control interface card of the SSD is first compressed by a compression engine in the SSD, to obtain compressed data. If a length of the compressed data is less than a threshold (preferably, the threshold may be lengths of partitions remained after one partition is subtracted from partitions in a NAND Flash physical page), a secondary-metadata generation unit in the SSD generates secondary metadata for the compressed data. The secondary metadata includes the length of the compressed data and an LBA of the compressed data. The length of the compressed data records an actual data length (for example, in units of bytes) of the compressed original data. "The LBA of the compressed data" represents an LBA of the original data. A format of the secondary metadata is shown in Table 4. The secondary-metadata generation unit may add the generated secondary metadata in front of the compressed data.

TABLE 4

| Length of compressed data | LBA address of the compressed data |
|---|---|
| Secondary metadata | |

A padding unit in the SSD adds padding data (content of padded data is not limited) behind the compressed data. A length of the padding data allows that a length of entire data (the secondary metadata+the compressed data+the padding data) is equal to a length of a smallest integer quantity of partitions, that is, the partition in Table 2. The padding unit stores the secondary metadata, the compressed data, and the padding data together in a buffer of the SSD. In the embodiments of the present disclosure, a location of the padding data is not limited. It may be the secondary metadata+the compressed data+the padding data, the compressed data+the padding data+the secondary metadata, or the like. The partition herein is a partition in a NAND flash physical page management format in Table 2. A sequence between the secondary metadata, the compressed data, and the padding data forms a compressed data management format and the compressed data management format is saved in a buffer. No padding data needs to be added and a length of the padding data is zero when the length of the entire data (a sum of the length of the compressed data and a length of the secondary metadata) is exactly equal to a length of an integer quantity of partitions.

An instance is used below to describe a processing manner of the padding data. For example, a size of a partition in a NAND flash physical page management format is 512 bytes, a length of secondary metadata is 6 bytes, and a length of compressed data is 900 bytes. A total length of the secondary metadata+the compressed data is 906 bytes that is greater than the length of one partition (512 bytes) and less than a length of two partitions (1024 bytes in total). A length of padding data should be the length of two partitions (1024 bytes) minus the total length of the secondary metadata+the compressed data (906 bytes), that is, 118 bytes.

Firmware in the SSD may select several pieces of compressed to-be-stored data according to a quantity of partitions occupied by each compressed data management format in the buffer, such that a total quantity of partitions occupied by the compressed data management format and the several pieces of compressed to-be-stored data are exactly equal to a quantity of partitions of one complete user data area. For example, a user data area has a total of 10 partitions whose sizes are 512 bytes each. If a size of a piece of buffered data (including secondary metadata+compressed to-be-stored data, or secondary metadata+compressed to-be-stored data+padding data) in the buffer is exactly 5120 bytes, the buffered data is written to one user data area. If a length of a piece of buffered data (including secondary metadata+compressed to-be-stored data, or secondary metadata+compressed to-be-stored data+padding data) is a length of three partitions, for example, 512×3=1536 bytes, a piece of buffered data (including secondary metadata+compressed to-be-stored data, or secondary metadata+compressed to-be-stored data+padding data) whose length is a length of seven partitions, for example, 512×7=3584 bytes, is selected to be stored in one user data area together with the buffered data with a length of three partitions.

In addition, the firmware in the SSD also constructs primary metadata that includes such information as a compression identifier and a quantity of partitions occupied by each compressed data management format. These compressed data management formats, together with the primary metadata and an ECC code, form a complete NAND flash physical page management format. It should be noted that the foregoing provides description using an example in which the firmware writes to-be-stored data into a user data area and constructs primary metadata and so on. In further implementation, the foregoing may also be implemented using hardware and in other manners. This is not limited in the embodiments of the present disclosure set no limitation thereto.

As shown in FIG. 1, FIG. 1 is a schematic structural diagram of an SSD storage device 100 according to an embodiment of the present disclosure. The SSD storage device 100 includes at least two storage units 101, and the storage unit is a smallest unit for performing a write or read operation in the SSD storage device.

The storage unit 101 includes a user data area, primary metadata, and an ECC code. Lengths of the user data area, the primary metadata, and the ECC code are fixed values.

The user data area includes at least two partitions having a same length, and each partition is configured to store compressed data.

The primary metadata in the storage unitrecords a compression identifier of data stored in the user data area and a quantity of partitions occupied by each piece of compressed data in the user data area.

The ECC code ensures consistency of data in the storage unit.

The foregoing storage unit 101 may be a NAND flash physical page in the SSD storage device.

In the foregoing SSD storage device, lengths of a user data area, primary metadata, and an ECC code in each storage unit are fixed values. As a result, a format of data stored in the storage unit is fixed, and the ECC code can also ensure consistency between data in the user data area and the primary metadata at a fixed code rate in order to ensure correctness and integrity of the data in the user data area and the primary metadata. This simplifies data management, reduces complexity of ECC hardware logic. In addition, a same service life of each storage unit, for example, a NAND flash physical page, is also ensured because of a same ECC code rate.

In an optional implementation manner, a user data area in each storage unit has a same quantity of partitions.

A user data area in each storage unit includes a same quantity of partitions. As a result, a length of an "a quantity of partitions occupied by each piece of compressed data" field in the primary metadata is a fixed value, and a format of the field is also a fixed format, such that the length of the primary metadata is a fixed value, and data management is simplified.

Optionally, the SSD storage device further includes a secondary-metadata generation unit configured to generate secondary metadata of to-be-stored data. The secondary metadata includes a length of the compressed to-be-stored data and an LBA of the compressed to-be-stored data.

According to the secondary metadata, when the data is read from a storage unit, partitions in which the data exists can be determined from a user data area according to the LBA of the data. In addition, invalid padding data in these partitions can be identified according to the length of the data, thereby avoiding sending the invalid padding data to a decompression engine. Therefore, the data can be quickly and efficiently read by parsing the secondary metadata.

In an optional implementation manner, the secondary-metadata generation unit adds the generated secondary metadata in front of the compressed to-be-stored data.

In this embodiment of the present disclosure, the SSD storage device further includes a padding unit configured to add padding data when a sum of a length of the secondary metadata and the length of the compressed to-be-stored data is not an integer multiple of the length of the partition, such that a sum of the length of the secondary metadata, the length of the compressed to-be-stored data, and a length of the padding data is a smallest integer multiple of the length of the partition.

The foregoing padded data may be any data, provided that the above-mentioned requirement regarding the length is met. Complete data can be written to each partition by padding data. Optionally, the SSD storage device further includes a buffer processing unit configured to write the secondary metadata and the compressed to-be-stored data into a buffer of the SSD storage device, or write the secondary metadata, the compressed to-be-stored data, and the padding data to a buffer of the SSD storage device after the padding unit adds the padding data.

The SSD storage device further includes a data writing unit configured to write one or more pieces of to-be-stored data whose lengths are equal to that of the user data area in the buffer into one storage unit of the SSD storage device.

In an optional implementation manner, the primary metadata further includes information about mapping of a logical address of the to-be-stored data to a physical address and information about a time at which the to-be-stored data is written to a NAND flash physical page of the SSD. A physical address is found according to the information about the mapping of the logical address to the physical address in order to read data from the physical address or write data to the physical address. A time at which the to-be-stored data is saved in the NAND flash physical page of the SSD may be obtained according to the time information of the to-be-stored data in the NAND flash physical page of the SSD.

Optionally, the foregoing SSD storage device further includes a data recovery unit.

The data recovery unit is configured to read, according to an LBA of to-be-read data included in a data read request, a user data area, primary metadata, and an ECC code in a storage unit corresponding to the LBA, obtain a quantity of pieces of compressed data in the user data area according to the primary metadata, obtain corresponding compressed data and secondary metadata, compare whether an LBA in the secondary metadata is consistent with the LBA in the data read request, and send the corresponding obtained compressed data to a decompression engine for decompression when the LBA in the secondary metadata is consistent with the LBA in the data read request.

When data needs to be read from the SSD storage device, the to-be-read data can be quickly recovered using the data recovery unit, and accuracy of the to-be-read data is ensured.

With reference to the foregoing SSD storage device, a process of writing data into the SSD storage device and a process of reading data from the SSD device in this embodiment of the present disclosure are described below.

The process of writing data into the foregoing SSD storage device in this embodiment of the present disclosure is as follows.

Step S1: The SSD storage device receives data that needs to be stored.

Step S2: A compression engine of the SSD device compresses the received data.

Step S3: Send the compressed data to a secondary-metadata generation unit of the SSD device if the compressed data is less than a preset threshold. Otherwise, directly save uncompressed data in a buffer of the SSD storage device.

Step S4: The secondary-metadata generation unit adds secondary metadata for the compressed data, where the secondary metadata includes a length of the compressed data and an LBA of the data.

Step S5: The secondary-metadata generation unit sends the generated secondary metadata and the compressed data to a padding unit when a sum of a length of the secondary metadata and the length of the compressed data is not an integer multiple of a length of a partition of a NAND flash physical page in the SSD storage device.

Step S6: The padding unit adds several pieces of padding data to an end of the compressed data, such that a total length of the secondary metadata, the compressed data, and the padding data is equal to that of a smallest integer quantity of partitions.

Step S7: A control unit in the SSD selects several pieces of compressed data from a buffer for combination, such that a total quantity of partitions occupied by combined compressed data are exactly equal to a quantity of partitions of user data space.

Step S8: The control unit in the SSD constructs primary metadata and sends the combined data (the secondary metadata+the compressed to-be-stored data, or the secondary metadata+the compressed to-be-stored data+the padding data) and the primary metadata to an encryption/scrambling module, and the encryption/scrambling module processes the combined data, and sends processed data to an ECC encoder.

Step S9: The ECC encoder adds an ECC code to an end of the data processed by the encryption/scrambling module.

Step S10: The ECC encoder sends, to a flash controller, data to which the ECC code is added, and the flash controller writes the data, to which the ECC code is added, to a NAND flash physical page.

The process of reading data from the foregoing SSD storage device in this embodiment of the present disclosure is as follows.

Step S1: A control unit in the SSD sends, to a data recovery unit, an LBA of data that needs to be read.

Step S2: The data recovery unit initiates a NAND flash controller, and reads, from a NAND flash memory, an entire user data area, primary metadata, and an ECC code corresponding to the LBA and in a NAND flash physical page, and after ECC decoding and decryption/unscrambling are performed on the user data area, the primary metadata, and the ECC code, a decryption/descrambling module sends data in the user data area and the primary metadata to the data recovery unit.

Step S3: The data recovery unit determines, according to a compression identifier in the primary metadata, whether the data in the user data area is compressed data, and if a compression identifier bit indicates that the data in the user data area is compressed data, parses out, according to the primary metadata, a quantity of pieces of compressed data included in the user data area, and obtains a saving location of secondary metadata.

Step S4: The data recovery unit parses each piece of secondary metadata, and compares whether an LBA of the secondary metadata is consistent with the LBA delivered by the control unit, and sends corresponding compressed data to a decompression engine if the LBA of the secondary metadata and the LBA delivered by the control unit are consistent.

Step S5: The decompression engine saves decompressed original data in a buffer.

Figure 2:
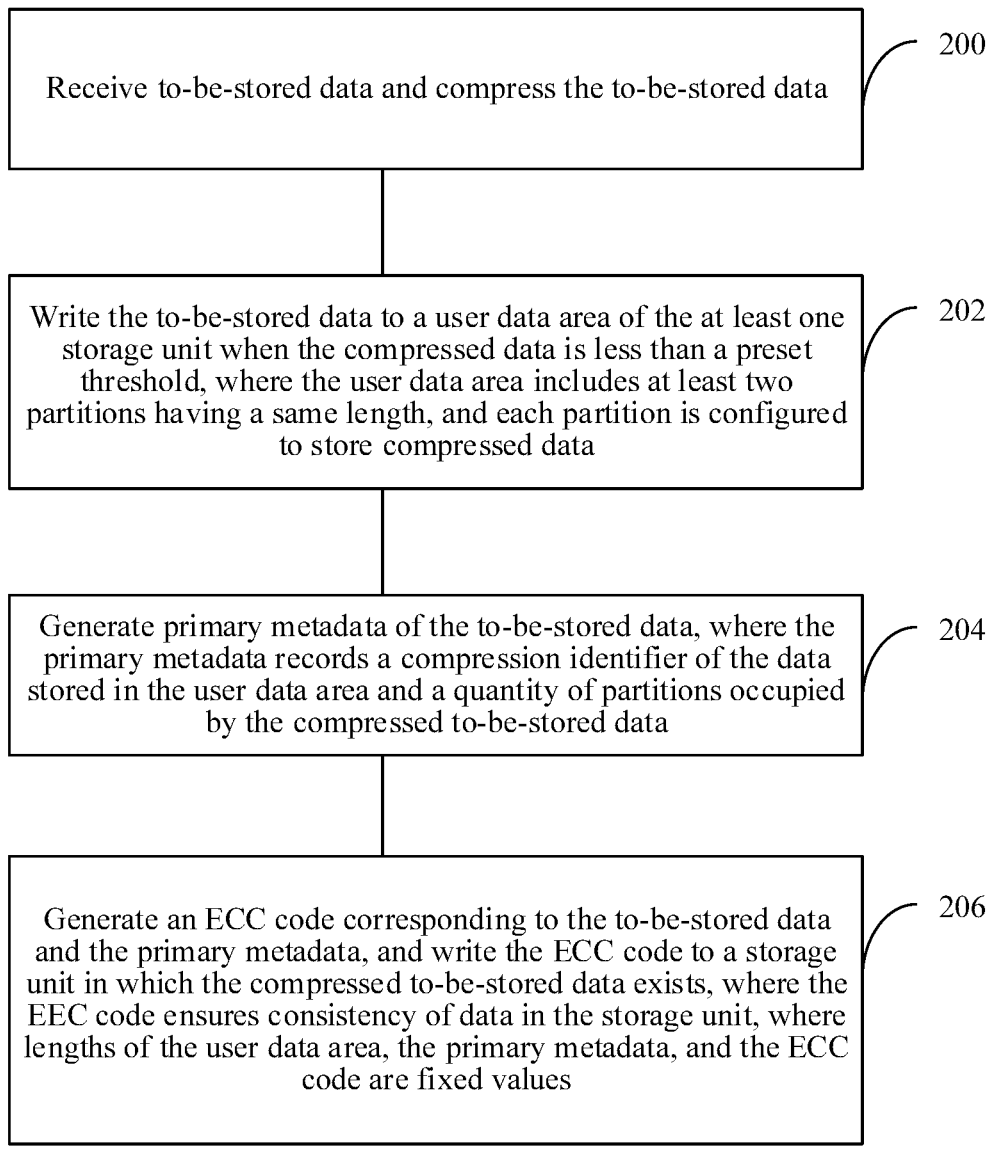
FIG. 2 is a schematic flowchart of a method for accessing data in an SSD storage device according to an embodiment of the present disclosure.

Step S6: The SSD storage device and a host interface module read the decompressed original sector data from the buffer, and send the data to the host. Referring to FIG. 2, FIG. 2 is a schematic flowchart of a method for accessing data in an SSD storage device according to an embodiment of the present disclosure. The SSD storage device includes at least one storage unit, and the storage unit is a smallest unit for performing a write or read operation in the SSD storage device. The method includes the following steps.

Step 200: Receive to-be-stored data and compress the to-be-stored data.

Step 202: Write the to-be-stored data to a user data area of the at least one storage unit when the compressed data is less than a preset threshold, where the user data area includes at least two partitions having a same length, and each partition is configured to store compressed data.

Step 204: Generate primary metadata of the to-be-stored data, where the primary metadata records a compression identifier of the data stored in the user data area and a quantity of partitions occupied by the compressed to-be-stored data.

Step 206: Generate an ECC code corresponding to the to-be-stored data and the primary metadata, and write the ECC code to a storage unit in which the compressed to-be-stored data exists, where the ECC code ensures consistency of data in the storage unit, where lengths of the user data area, the primary metadata, and the ECC code are fixed values.

The foregoing storage unit may be a NAND flash physical page in the SSD storage device.

In the foregoing method, to-be-stored data is written to a user data area of a storage unit, primary metadata and an ECC code in each storage unit are constructed, and lengths of a user data area, the primary metadata, and the ECC code in each storage unit are fixed values. As a result, a format of data stored in the storage unit is fixed, and the ECC code can also ensure consistency between data in the user data area and the primary metadata at a fixed code rate in order to ensure correctness and integrity of the data in the user data area and the primary metadata. This simplifies data management, reduces complexity of ECC hardware logic. In addition, a same service life of each storage unit, for example, a NAND flash physical page, is also ensured because of a same ECC code rate.

Optionally, in the foregoing method, a user data area in each storage unit has a same quantity of partitions.

A user data area in each storage unit includes a same quantity of partitions. As a result, a length of an "a quantity of partitions occupied by each piece of compressed data" field in the primary metadata is a fixed value, and a format of the field is also a fixed format, such that the length of the primary metadata is a fixed value, and data management is simplified.

When the length of the compressed data is less than the preset threshold, the method further includes generating secondary metadata of the to-be-stored data, where the secondary metadata includes a length of the compressed to-be-stored data and an LBA of the compressed to-be-stored data.

According to the secondary metadata, when the data is read from a storage unit, partitions in which the data exists can be determined from a user data area according to the LBA of the data. In addition, invalid padding data in these partitions can be identified according to the length of the data, thereby avoiding sending the invalid padding data to a decompression engine. Therefore, the data can be quickly and efficiently read by parsing the secondary metadata.

Optionally, the foregoing method may further include adding padding data when a sum of a length of the secondary metadata and the length of the compressed to-be-stored data is not an integer multiple of the length of the partition, such that a sum of the length of the secondary metadata, the length of the compressed to-be-stored data, and a length of the padding data is a smallest integer multiple of the length of the partition.

The foregoing padded data may be any data, provided that the above-mentioned requirement regarding the length is met. Complete data can be written to each partition by padding data.

In an optional implementation manner, the generated secondary metadata may be added in front of the compressed to-be-stored data.

In this embodiment of the present disclosure, the method further includes writing the secondary metadata and the compressed to-be-stored data to a buffer of the SSD storage device, or writing the secondary metadata, the compressed to-be-stored data, and the padding data to a buffer of the SSD storage device.

The writing the to-be-stored data to a user data area of the at least one storage unit may include writing one or more pieces of buffered data whose lengths are equal to that of the user data area in the buffer to one storage unit of the SSD storage device, where the buffered data includes the secondary metadata and the compressed to-be-stored data, or the buffered data includes the secondary metadata, the compressed to-be-stored data, and the padding data.

In this embodiment of the present disclosure, the primary metadata further includes information about the mapping of a logical address of the to-be-stored data to a physical address and information about a time at which the to-be-stored data is written to the storage unit. A physical address is found according to the information about the mapping of the logical address to the physical address in order to read data from the physical address or write data to the physical address. A time at which the to-be-stored data is saved in a NAND flash physical page of the SSD may be obtained according to the time information of the to-be-stored data in the NAND flash physical page of the SSD.

The method for accessing data in an SSD storage device according to this embodiment of the present disclosure may further include reading, according to an LBA of to-be-read data included in a data read request, a user data area, primary metadata, and an ECC code in a storage unit corresponding to the LBA, obtaining a quantity of pieces of compressed data in the user data area according to the primary metadata, obtaining corresponding compressed data and secondary metadata, comparing whether an LBA in the secondary metadata is consistent with the LBA in the data read request, and sending the corresponding obtained compressed data to a decompression engine for decompression when the LBA in the secondary metadata is consistent with the LBA in the data read request.

According to the foregoing method for accessing data in an SSD storage device, when data needs to be read from the SSD storage device, the to-be-read data can be quickly recovered, and accuracy of the to-be-read data is ensured.

A person of ordinary skill in the art may be aware that, the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiment, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be indirect couplings or communication connections between some interfaces, apparatuses, and units, or may be connections in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable disk, a read-only memory (ROM), a random access memory (RAM), a magnetic disk, or an optical disc.

The foregoing descriptions are merely embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A solid state disk (SSD) storage device, comprising:
a processor; and
a plurality of storage units coupled to the processor,
wherein each storage unit is a smallest unit to which the processor can perform a write or read operation in the SSD storage device,
wherein each storage unit comprises a user data area, primary metadata, and error checking and correction (ECC) code,
wherein each user data area comprises a first fixed number of bytes,
wherein each primary metadata comprises a second fixed number of bytes,
wherein each ECC code comprises a third fixed number of bytes,
wherein each user data area comprises at least two partitions comprising a same length, and each partition is configured to store compressed data,
wherein each primary metadata is configured to record a compression identifier of the compressed data and a quantity of partitions occupied by each piece of compressed data in the user data area,
wherein each ECC code is configured to ensure consistency of data in one of the storage units,
wherein the processor is configured to generate secondary metadata for each storage unit,
wherein each secondary metadata comprises a length of the compressed data and a logical block address (LBA) of the compressed data,
wherein the processor is further configured to append padding data when a sum of a length of the secondary metadata and the length of the compressed data is not an integer multiple of a length of a partition, and wherein a sum of the length of the secondary metadata, the length of the compressed data, and a length of the padding data is a smallest integer multiple of the length of the partition.

2. The SSD storage device of claim 1, wherein each user data area comprises a same quantity of partitions.

3. The SSD storage device of claim 1, wherein the processor is further configured to append the secondary metadata in front of the compressed data.

4. The SSD storage device of claim 1, wherein the processor is further configured to write the secondary metadata and the compressed data into a buffer of the SSD storage device.

5. The SSD storage device of claim 4, wherein the processor is further configured to write one or more pieces of buffered data in the buffer to at least one of the storage units of the SSD storage device, wherein lengths of the buffered data are equal to the user data area, and wherein the buffered data comprises either:
the secondary metadata and the compressed data; or
the secondary metadata, the compressed data, and the padding data.

6. The SSD storage device of claim 5, wherein the processor is further configured to:
read, according to an LBA of to-be-read data comprised in a data read request, the user data area, the primary metadata, and the ECC code in one of the storage units corresponding to the LBA;
obtain a quantity of pieces of compressed data in the user data area according to the primary metadata;
obtain corresponding compressed data and secondary metadata;
compare whether an LBA in the secondary metadata is consistent with the LBA in the data read request; and
send the corresponding compressed data to a decompression engine for decompression when the LBA in the secondary metadata is consistent with the LBA in the data read request.

7. The SSD storage device of claim 1, wherein the processor is further configured to write the secondary metadata, the compressed data, and the padding data into a buffer of the SSD storage device after appending the padding data.

8. The SSD storage device of claim 1, wherein the primary metadata further comprises information of:
mapping of a logical address of data to a physical address; and
a time at which data is written to one of the storage units.

9. A method for accessing data in a solid state disk (SSD) storage device, wherein the SSD storage device comprises a plurality of storage units, where each storage unit is a smallest unit to which a processor can perform a write or read operation in the SSD storage device, wherein each storage unit comprises a user data area, primary metadata, and error checking and correction (ECC) code, and wherein the method comprises:
receiving data;
compressing the data to generate compressed data;
writing the compressed data to one of the user data areas of one of the storage units when a length of the compressed data is less than a preset threshold, wherein the user data area comprises at least two partitions having a same length, and wherein each partition of the at least two partitions is configured to store the compressed data;
generating the primary metadata of the data, wherein the primary metadata records a compression identifier of the data in the user data area and a quantity of partitions occupied by the compressed data;
generating the ECC code corresponding to the data and the primary metadata; and
writing the ECC code to one of the storage units in which the compressed data exists,
wherein each ECC code ensures consistency of data in one of the storage units,
wherein each user data area comprises a first fixed number of bytes,
wherein each primary metadata comprises a second fixed number of bytes,
wherein each ECC code comprises a third fixed number of bytes,
wherein when the compressed data is less than a preset threshold, the method further comprises generating secondary metadata,
wherein the secondary metadata comprises a length of the compressed data and a logical block address (LBA) of the compressed data,
wherein the method further comprises appending padding data when a sum of a length of the secondary metadata and the length of the compressed data is not an integer multiple of a length of a partition, and
wherein a sum of the length of the secondary metadata, the length of the compressed data, and a length of the padding data is a smallest integer multiple of the length of the partition.

10. The method of claim 9, wherein each user data area in each storage unit comprises a same quantity of partitions.

11. The method of claim 9, further comprising appending the secondary metadata in front of the compressed data.

12. The method of claim 9, further comprising writing the secondary metadata and the compressed data into a buffer of the SSD storage device.

13. The method of claim 12, wherein writing the compressed data into one of the user data areas comprises writing one or more pieces of buffered data in the buffer to at least one of the storage units of the SSD storage device, wherein lengths of the buffered data are equal to the user data area, and wherein the buffered data comprises either:
the secondary metadata, the compressed data, and the padding data; or
the secondary metadata and the compressed data.

14. The method of claim 13, further comprising:
reading, according to an LBA of to-be-read data comprised in a data read request, the user data area, the primary metadata, the ECC code in one of the storage units corresponding to the LBA;
obtaining a quantity of pieces of compressed data in the user data area according to the primary metadata;
obtaining corresponding compressed data and secondary metadata;
comparing whether an LBA in the secondary metadata is consistent with the LBA in the data read request; and
sending the corresponding compressed data to a decompression engine for decompression when the LBA in the secondary metadata is consistent with the LBA in the data read request.

15. The method of claim 9, further comprising writing the secondary metadata, the compressed data, and the padding data into a buffer of the SSD storage device.

16. The method of claim 9, wherein the primary metadata further comprises information of:

mapping of a logical address of the data to a physical address; and a time at which the data is written to at least one of the storage units.

17. A solid state disk (SSD) storage device, comprising:
a processor; and
a plurality of storage units coupled to the processor,
wherein each storage unit is a smallest unit to which the processor can perform a write or read operation in the SSD storage device,
wherein each storage unit comprises a user data area, primary metadata, and error checking and correction (ECC) code,
wherein each user data area comprises a first fixed number of bytes,
wherein each primary metadata comprises a second fixed number of bytes,
wherein each ECC code comprises a third fixed number of bytes,
wherein each user data area comprises at least two partitions comprising a same length, and each partition is configured to store compressed data,
wherein each primary metadata is configured to record a compression identifier of the compressed data and a quantity of partitions occupied by each piece of compressed data in the user data area,
wherein each ECC code is configured to ensure consistency of data in one of the storage units,
wherein the processor is configured to generate secondary metadata for each storage unit,
wherein each secondary metadata comprises a length of the compressed data and a logical block address (LBA) of the compressed data,
wherein the processor is further configured to write the secondary metadata and the compressed data into a buffer of the SSD storage device,
wherein the processor is further configured to write one or more pieces of buffered data in the buffer to at least one of the storage units of the SSD storage device,
wherein each length of each piece of the buffered data is equal to the length of each of the at least two partitions, and
wherein each piece of the buffered data comprises either:
the secondary metadata and the compressed data; or
the secondary metadata, the compressed data, and padding data.

* * * * *